(12) United States Patent
Schwelm (10) Patent No.: US 9,395,014 B2
(45) Date of Patent: Jul. 19, 2016

(54) PILOT-CONTROL STAGE FOR A PROPORTIONALLY CONTROLLED HIGH-PRESSURE HYDRAULIC VALVE

(71) Applicant: Dynamics Systems S.A., Luxemburg (LU)

(72) Inventor: Hans Schwelm, Kaarst (DE)

(73) Assignee: DYNAMICS SYSTEMS S.A., Luxemburg (LU)

( * ) Notice: Subject to any disclaimer, the term of this patent is extended or adjusted under 35 U.S.C. 154(b) by 17 days.

(21) Appl. No.: 14/256,145

(22) Filed: Apr. 18, 2014

(65) Prior Publication Data

US 2014/0225016 A1   Aug. 14, 2014

Related U.S. Application Data

(63) Continuation of application No. PCT/DE2012/000984, filed on Oct. 9, 2012.

(30) Foreign Application Priority Data

Oct. 20, 2011 (DE) .......................... 10 2011 116 393

(51) Int. Cl.
*F16K 27/08* (2006.01)
*F16K 31/06* (2006.01)
(Continued)

(52) U.S. Cl.
CPC .......... *F16K 31/0675* (2013.01); *F15B 13/0433* (2013.01); *F16K 31/0693* (2013.01); *F16K 31/408* (2013.01); *F16K 37/0041* (2013.01); *H01F 7/1607* (2013.01)

(58) Field of Classification Search
CPC ............. F15B 13/0433; F16K 31/0693; F16K 31/408; F16K 37/0041
USPC ........................................... 251/129.07, 282
See application file for complete search history.

(56) References Cited

U.S. PATENT DOCUMENTS 3,446,471 A * 5/1969 Westphal ............ F16K 31/0689
251/129.17
4,457,341 A * 7/1984 Aspinwall ........... F15B 13/0402
137/614.17

(Continued)

FOREIGN PATENT DOCUMENTS

DE       8813817        3/1990
DE      19912488        9/2000

(Continued)

OTHER PUBLICATIONS

Patent Cooperation Treaty, "International Preliminary Report on Patentability and Written Opinion," issued by the International Searching Authority in connection with PCT application No. PCT/DE2012/000984, mailed on Apr. 22, 2014, 7 pages.

(Continued)

*Primary Examiner* — Marina Tietjen
*Assistant Examiner* — Seth W MacKay-Smith
(74) *Attorney, Agent, or Firm* — Hanley, Flight & Zimmerman, LLC (57) ABSTRACT

Example pilot-control stage for a proportionally controlled high-pressure hydraulic valves are disclosed. An example pilot-control stage includes a housing of a hydraulic valve, the housing comprising a piston chamber, a guide piston disposed within the piston chamber to move in an axial direction along the piston chamber, the guide piston having an aperture and a tappet, a compensating piston extending into the aperture, where the compensating piston moves in an axial direction along the aperture to define a compensating chamber, a bore fluidly coupling the hydraulic valve to the compensating chamber, an electromagnetic coil at least partially surrounding the piston chamber, and high-pressure seals between the compensating piston and the control piston, and between the tappet and the housing, where the control piston acts as an electromagnetic armature and current applied to the coil moves the guide piston and the tappet, and where the high-pressure seals isolate the piston chamber from the high-pressure areas.

19 Claims, 7 Drawing Sheets

(51) Int. Cl.
*F16K 39/02* (2006.01)
*F15B 13/043* (2006.01)
*F16K 31/40* (2006.01)
*F16K 37/00* (2006.01)
*H01F 7/16* (2006.01)

(56) References Cited

U.S. PATENT DOCUMENTS

| | | | | |
|---|---|---|---|---|
| 4,553,735 A * | 11/1985 | Brundage | ............ | F16K 31/0655 137/454.5 |
| 4,821,774 A * | 4/1989 | Chorkey | ............. | F16K 31/0693 137/625.26 |
| 5,741,002 A * | 4/1998 | Breyer | ................ | F16K 31/0655 137/487.5 |
| 6,257,276 B1 * | 7/2001 | Muller | ................ | F16K 37/0041 116/277 |
| 6,786,237 B2 * | 9/2004 | Yajima | ................ | F15B 13/0402 137/554 |
| 6,998,948 B2 * | 2/2006 | Huerta | ................ | F16K 31/0693 335/251 |
| 7,156,121 B2 * | 1/2007 | Cox | .................... | F16K 31/1221 137/15.01 |
| 8,348,231 B2 * | 1/2013 | Czimmek | .............. | F02M 23/00 251/129.07 |
| 2008/0264497 A1 * | 10/2008 | Rodriguez | .......... | F16K 37/0041 137/553 |

FOREIGN PATENT DOCUMENTS

| | | | |
|---|---|---|---|
| DE | 102007054655 | 6/2009 | |
| DE | 102007054655 B3 * | 6/2009 | .......... F16K 31/0693 |
| WO | 2013056689 | 4/2013 | |

OTHER PUBLICATIONS

Patent Cooperation Treaty, "International Search Report," issued by the International Searching Authority in connection with PCT application No. PCT/DE2012/000984, 4 pages.

* cited by examiner (PRIOR ART)

PILOT-CONTROL STAGE FOR A PROPORTIONALLY CONTROLLED HIGH-PRESSURE HYDRAULIC VALVE

RELATED APPLICATIONS

This patent arises from a continuation of International Patent Application Serial No. PCT/DE2012/000984, filed Oct. 9, 2012, which claims priority to German Patent Application No. DE 10 2011 116 393, filed on Oct. 20, 2011, both of which are hereby incorporated herein by reference in their entireties.

FIELD OF THE DISCLOSURE

The present disclosure relates to proportionally controlled high-pressure hydraulic valves and, more specifically, to a pilot-control stage for proportionally controlled high-pressure hydraulic valves.

BACKGROUND

Hydraulic valves are used for operating robots, tools or automated production lines. The hydraulic valve can be used in the low-pressure range of up to 100 bar for many uses. For other uses, such as in agriculture for example, where earth-working and plant processing tools fastened on tractors or combine harvesters are hydraulically operated, in cranes, large presses or injection moulding machines, it is necessary to operate the hydraulic valves in the high-pressure range from 150 bar to 500 bar, in special cases up to 1200 bar due to the acting forces.

In low-pressure hydraulic valves proportional magnets are often used for controlling the hydraulic valve, in which a proportional opening or closing of the valve is controlled via the power supply. Such a proportional valve is known is known from DE 88 13 817.8. The forces exerted by a coil onto an armature axis of such a proportional valve are however limited, so that the use of proportional magnets in the high-pressure range of a hydraulic pressure between 100 and 150 bar is not possible.

DETAILED DESCRIPTION

In order to be able to apply the high forces required for opening and closing a hydraulic valve at a hydraulic pressure of 150 bar and upwards, and to implement a precise and, above all, proportional control, proportional valves with a pilot-control stage and a main stage are used. A guide piston located in the pilot-control stage controls the following piston located in the main stage. The guide piston is configured as a step piston so that the tappet can already be moved at a low control pressure. This is described in greater detail below in connection with FIG. 1.

Figure 1:
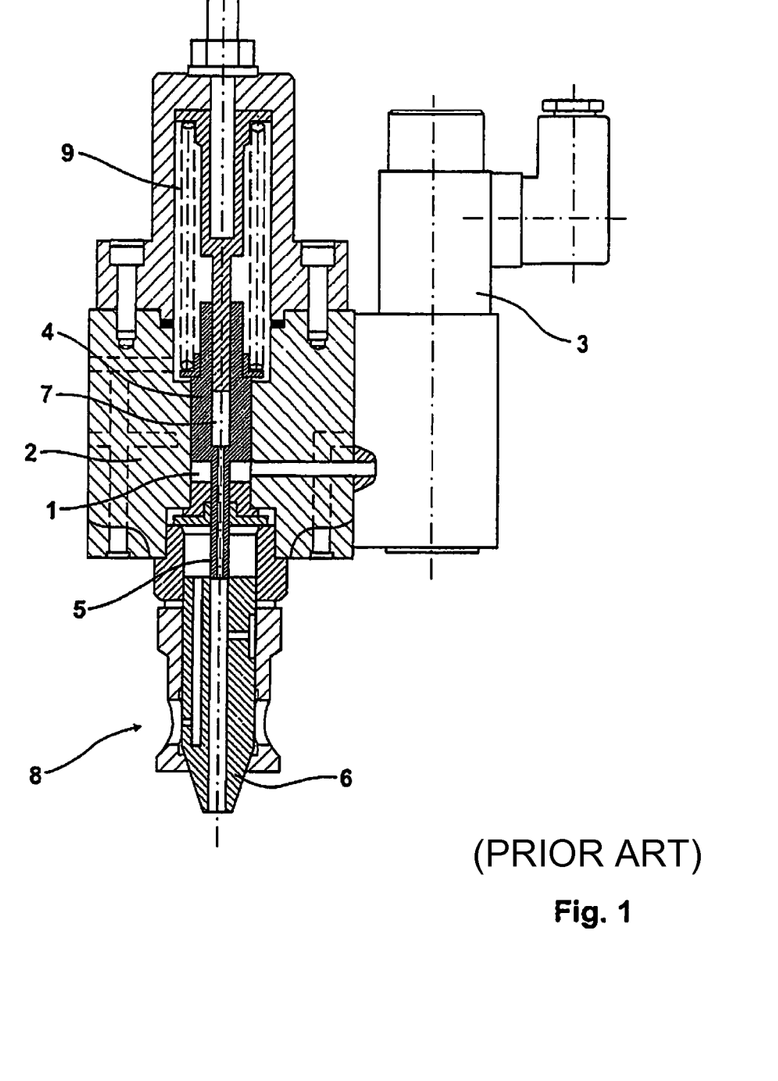
FIG. 1 shows a sectional representation of a proportionally controlled 2-way valve according to the prior art.

FIG. 1 illustrates a known example proportionally controlled 2-way cartridge valve, which operates according to the follow-up piston principle. A first fluid chamber 1 is charged with the desired control pressure by way of a proportional magnet disposed on the housing 2 in connection with a throttle valve 3, so that the guide piston 4 located in the housing 2 moves axially. The tappet 5 is moved by the guide piston 4 and lifts off the following piston 6 so that the compensating chamber 7 is charged with the pressure acting on the hydraulic valve 8. At the same time, the following piston 6 follows the tappet 5 and opens the hydraulic valve 8 proportionally to the movement of the control piston 4.

In some examples, such hydraulic valves require a lot of space because the proportional magnet and the throttle valve 3 are flanged on the outside and because appropriate connecting pipes are required, so that an efficient use in agricultural machines, for example, is not possible.

Based on this, the problem underlying the examples disclosed herein is to provide a pilot-control of the examples disclosed herein that offers the same performance while taking up much less space and being less expensive to manufacture.

As a technical solution to this problem, the examples disclosed herein provide a pilot-control stage with the features disclosed herein.

A pilot-control stage configured according to this technical teaching is advantageous in that it also operates as a magnet, wherein the guide piston acts as an armature and wherein the coil is fastened around the outside of the housing. Thus, it is possible to eliminate the proportional magnet and the throttle valve flanged on the outside. The pilot-control stage according to the examples disclosed herein can have a much more compact design, which leads to saving a considerable amount of space. Production costs are also considerably reduced, not only because the external proportional magnet and the connected throttle valve could be eliminated but, in addition, because control pipes are no longer required.

Another advantage is that due to the use of high-pressure seals, the piston chamber can be kept pressureless, or at least only needs to be charged with low pressures. Thus, the pole tube can be designed to be correspondingly thin-walled, which leads to additional space and cost savings. A piston chamber that is pressure-free or charged only with low pressures is more specifically very advantageous when the pole tube is divided into two parts by a welded separation ring because the weld seam is stressed only by low forces.

Yet another advantage is that the pressure in the piston chamber is the same on both sides of the guide piston. The resistance during the axial displacement of the guide piston is thus reduced so that the responding behaviour of the control stage is improved and the dead band and hysteresis of the hydraulic valve are reduced. These advantages become particularly significant when the piston chamber is kept pressureless or at low pressures.

Yet another advantage is that by eliminating the proportional magnet, the throttle valve, and the connecting pipes, inherent manufacturing tolerances can be eliminated, so that fewer manufacturing tolerances have an effect on the device according to the examples disclosed herein.

However, since the fault tolerances in such hydraulic devices add up, the lack of a proportional magnet leads to a more precise device, which allows for a much more precise control of the hydraulic valve.

Yet another advantage is that due to the reduced number of components, the weight is also reduced.

In an advantageous development, a connecting bore is provided for improved pressure compensation in the control piston.

In a preferred example, the piston chamber is free of hydraulic fluid, except for some leak oil. This also improves the responding behavior and reduces the dead band and the hysteresis.

In another advantageous development, a leak oil bore is connected to the piston chamber, so that possible leak oil can drain off and the piston chamber remains at least predominantly free of leak oil.

In a preferred example, a spring, advantageously a pressure spring, is provided in the piston chamber, by means of which an emergency shut-off of the hydraulic valve is achieved. This is advantageous in that an emergency safety device is thus created, which, in a case of a breakdown of the hydraulic system, brings the control piston into a rest position in which the hydraulic valve is closed. Thus, in case of a malfunction of the hydraulic system, it can be ensured that the hydraulic system is closed and that no damage is caused.

In a particularly preferred example, the hydraulic cross-section of the compensating piston is identical to the hydraulic cross-section of the tappet. The advantage of this is that due to the identical cross-sections the forces generated by the pressure acting on the hydraulic valve and acting on the guide piston are completely compensated for. Thus, the electromagnetic valve only requires little forces in order to move the guide piston axially and can have correspondingly small dimensions.

In a preferred example the coil is designed in such a manner that the generated magnetic field pulls the guide piston. This is advantageous in that the guide piston can thereby be moved very precisely, even if the desired stroke amounts to merely a few tenths of a millimeter.

In another preferred example the high-pressure seal is configured as a gap seal, the gap of which is no wider than 8 micrometers ($\mu$m), preferably no wider than 4 $\mu$m and most preferably only 1 $\mu$m wide. Such a gap seal is advantageous in that it is very resistant to wear, causes little friction but still reduces the passage of hydraulic fluid to a minimum. Due to the low friction, the gap seal achieves an advantageous responding and hysteresis behavior.

In a particularly preferred example, a sheath, which interacts with a displacement sensor mounted in the housing, is attached to the guide piston. Such a displacement sensor (more specifically a Linear Variable Differential Transformer or "LVDT") detects the current position of the guide piston, so that pre-programmed safety functions can be detected.

It has proven advantageous to mount the spring outside the sheath, so that the displacement sensor can directly detect the sheath without being disturbed by the spring.

The sequence of the method for operating a pilot-control stage for proportionally controlling a high-pressure hydraulic valve according to the examples disclosed is as follows: the guide piston is moved in an axial direction within the piston chamber of the housing by generating a magnetic field, the guide piston simultaneously serving as an armature of the magnet. At the same time, a compensation of the forces exerted by the hydraulic valve on the tappet is achieved by the compensating chamber connected to the hydraulic valve, so that the coil does not have to overcome the resistances generated by the hydraulic system and that the tappet can be moved by correspondingly low forces.

In the rare event that leak oil is located in the piston chamber, leak oil bores, through which the leak oil can flow out, are correspondingly provided. In some examples, there is a connecting bore in the guide piston to provide pressure compensation within the piston chamber.

Other advantages of the pilot-control stage according to the examples disclosed herein can be gathered from the attached drawings and the examples described. According to the examples disclosed herein, the previously mentioned features, and the features to be mentioned in the following, can also be used respectively individually or in any combination of each other. The mentioned examples are not to be understood as an exhaustive list but rather as examples.

Turning to the figures, FIG. 1 shows a known proportionally controlled 2-way high-pressure hydraulic cartridge valve, whose pilot-control stage includes a housing 2 and a guide piston held therein so as to be axially movable. The guide piston is composed of a control piston 4 and a tappet 5 attached to it. This tappet reaches through the housing 2 and interacts with the 2-way hydraulic valve 8. A proportional magnet 3 with an integrated pressure reduction valve, which charges the fluid chamber 1 with the control pressure required for the respective use is flanged on the side. Depending on the desired situation, the control piston 4 is moved axially upwards or downwards by way of the control pressure. A spring 9 thereby acts on the control piston 4 and brings it respectively back into its initial position. A compensating chamber 7, which is charged with the pressure applied to the hydraulic valve 8, is formed inside the control piston 4. If the guide piston is lifted and thereby detaches the tappet 5 from the following piston 6 of the hydraulic valve 8, the following piston 6 follows this movement until it rests again on the tappet 5. Thus the following piston 6 of the hydraulic valve 8 can be controlled in this manner by way of the control piston 4.

Figure 2A:
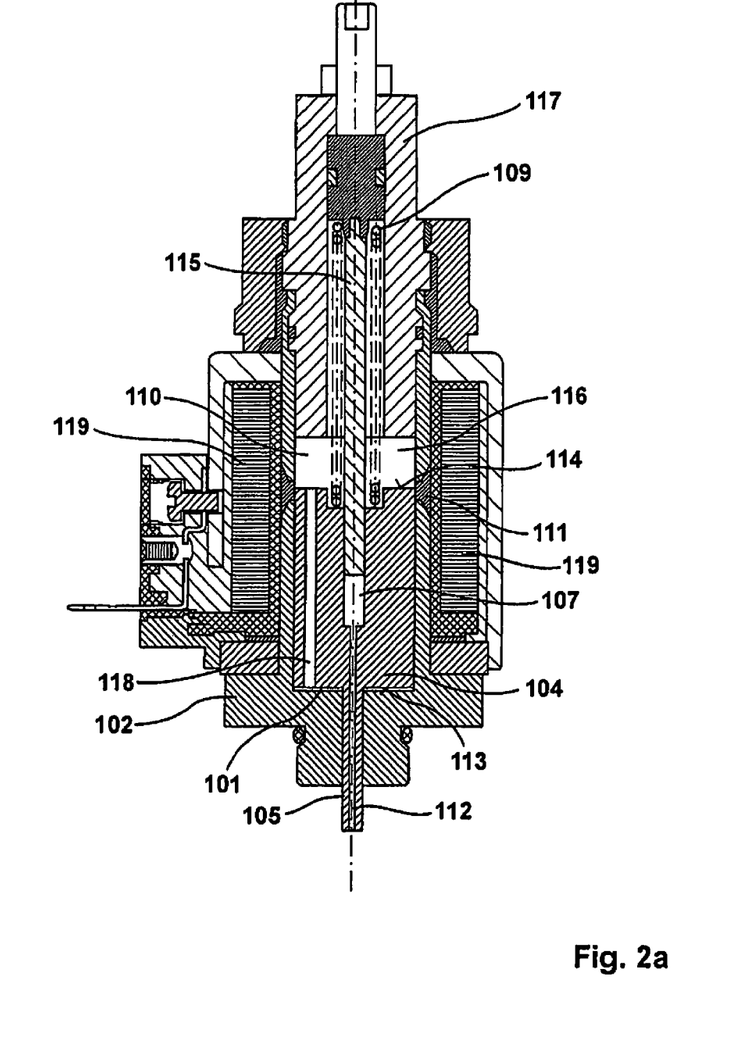
FIG. 2a shows a sectional representation of a first example of a pilot-control stage in a resting state in accordance with the teachings of this disclosure.
Figure 2B:
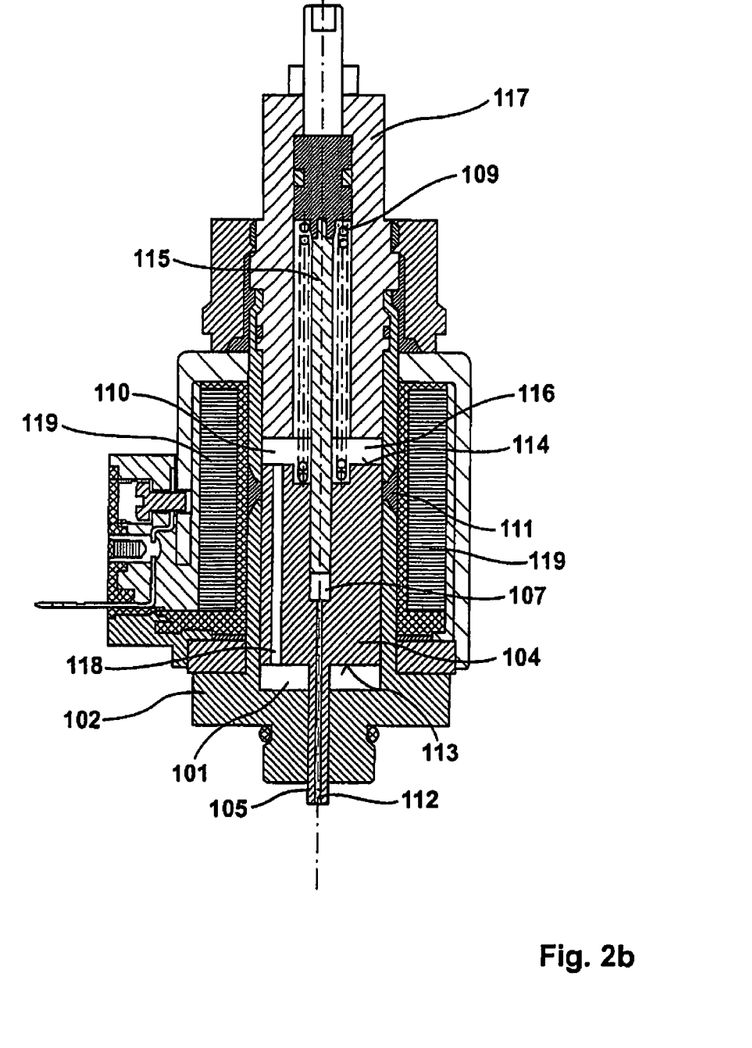
FIG. 2b shows the example pilot-control stage according to FIG. 2a in an operating state.

FIGS. 2a and 2b show a first example of a pilot-control stage for proportionally controlling a high-pressure hydraulic valve in accordance with the teachings of this disclosure, wherein FIG. 2a shows the guide piston in a rest position and FIG. 2b shows the guide piston in an operating position. This pilot-control stage includes a housing 102 with a piston chamber 110 formed in the housing 102, in which a guide piston configured as a stage piston is held so as to be axially movable. This guide piston includes a control piston 104 and a tappet 105 attached to it that are guided in the piston chamber 110, wherein the tappet 105 reaches through the housing 102 and acts on a following piston 106 of the hydraulic valve 108.

In the area of the control piston 104, the housing 102 is configured as a pole tube. This pole tube comprises a first area that is level with the control piston 104 and a second area that is above the control piston 104. The two areas are separated by a separation layer 111, wherein the material forming the separation layer 111 differs from the material of the housing 102, so that a magnetic separation of the housing 102 into a first area and a second area takes place. In the example shown here, the two areas are welded together, so that the separation layer 111 is a weld seam.

The guide piston with its control piston 104 accurately fits into the piston chamber 110 and is guided therein, a gap seal not shown here being provided between the control piston 104 and the housing 102, wherein the gap between the control piston 104 and the interior wall of the housing 102 amounts to a maximum of 8 $\mu$m, preferably only 4 $\mu$m and most preferably only 1 $\mu$m.

In another example not shown here, the gap seal between the control piston 104 and the housing 102 can also be thicker.

A gap seal is also formed between the tappet 105 and the housing 102, wherein the gap between the outside wall of the tappet 105 and the interior wall of the housing 102 also amounts to a maximum of 8 μm, preferably only 4 μm and most preferably only 1 μm. The piston chamber 110 is sealed against the hydraulic fluid of the hydraulic system by way of this gap seal.

A compensating chamber 107, to which a tappet bore 112 is connected, is coaxially formed in the control piston 104 around its longitudinal axis. This tappet bore 112 reaches from the compensating chamber 107 through a part of the control piston 104 and through the entire tappet 105 and allows for pressure compensation between the compensating chamber 107 and the pressure applied to the hydraulic valve.

The tappet 105 is attached to a first front side 113 of the control piston 104, whereas the compensating chamber 107 opens into a second front side 114 of the control piston 104. This compensating chamber 107 is sealed off by a compensating piston 115 that reaches into the compensating chamber 107. A gap seal, whose thickness amounts to a maximum of 8 μm, preferably only 4 μm and most preferably only 1 μm, is also provided between the compensating piston 115 and the control piston 104.

A first fluid chamber 101 is formed in the piston chamber 110 contiguously to the first front side 113 of the control piston 104, whereas a second fluid chamber 116 is provided contiguously to the second front side 114 of the control piston 104. The piston chamber 110 and correspondingly also the second piston chamber 116 is limited at the top by a limit-stop 117 that is permanently fixed to the housing 102. In addition to the compensating piston 115, a pressurized spring 109, which is configured as a spiral-coiled spring, is also mounted on the limit-stop 117. This spring 109 reaches up to the second front side 114 of the control piston 104 and permanently acts on the control piston 104. The spring 109 is designed in such a manner that the control piston 104 is pressed into the housing 102 if the device is to take up its rest position. Such a rest position is shown in FIG. 2a. In this rest position, the tappet 105 closes the hydraulic valve 108 not shown here and the fluid chamber 101 is simultaneously reduced in size to a minimum.

In FIG. 2b, the guide piston is shown in its operating position, the first fluid chamber 101 taking up a certain size corresponding to the position of the control piston 104 and the second fluid chamber 116 being correspondingly smaller. A connection bore 118 provided in the control piston 104 allows for pressure compensation between the first fluid chamber 101 and the second fluid chamber 116, so that the control piston 104 does not have to absorb forces in order to overcome a possible pressure difference during its axial movement.

A coil 119 is provided outside of the housing 102, which extends along the entire circumference of the housing 102. Together with the control piston 104, this coil 119 forms an electromagnet, where the control piston 104 serves as an axially displaceable armature of the electromagnet.

Figure 3:
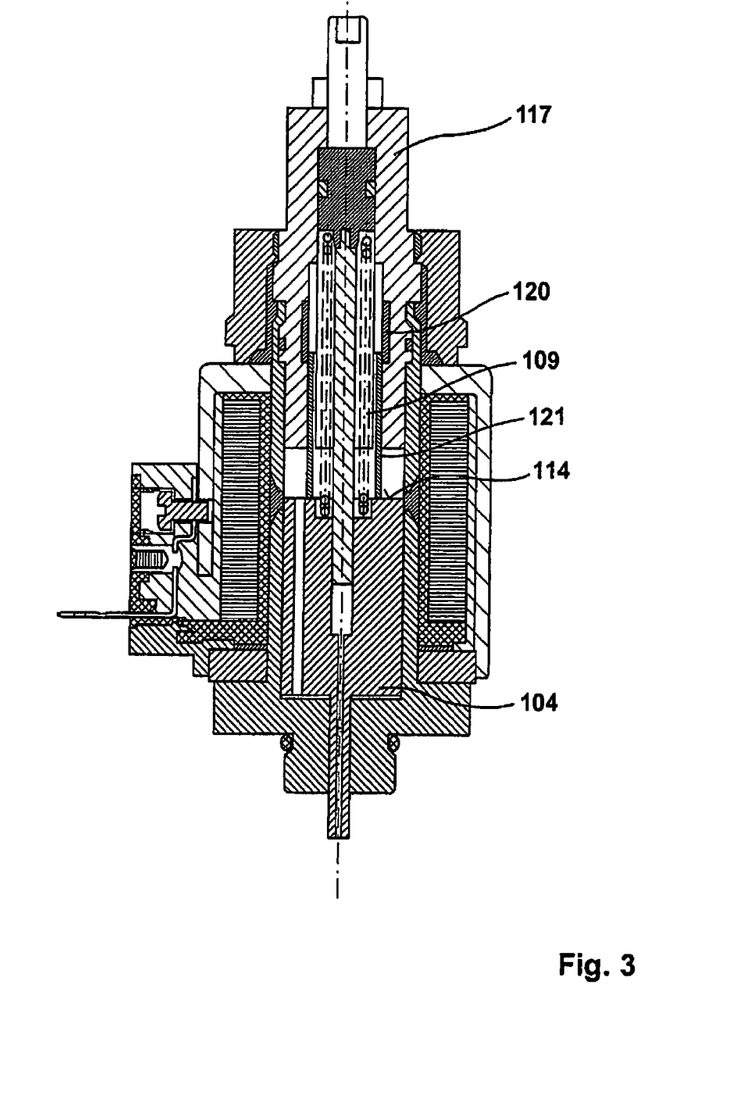
FIG. 3 shows an example sectional representation of a second example of a pilot-control stage according to the examples disclosed in a resting state.

FIG. 3 shows a second example of the pilot-control stage according to the examples disclosed herein, this second example corresponding to the first example shown in FIGS. 2a and 2b and additionally comprises a displacement sensor 120, an LVDT, embedded in the limit-stop 117. A sheath 121, which reaches up to the displacement sensor 120 is coaxially attached to the second front side 114 of the control piston 104. The end of the sheath 121 is always located in the area of the displacement sensor 120, so that all possible positions of the control piston 104 and, thus, of the tappet 105 are detected by the displacement sensor 120. The sheath 121 is disposed around the spring 109, so that the sheath is in direct visual contact with the displacement sensor 120.

Figure 4:
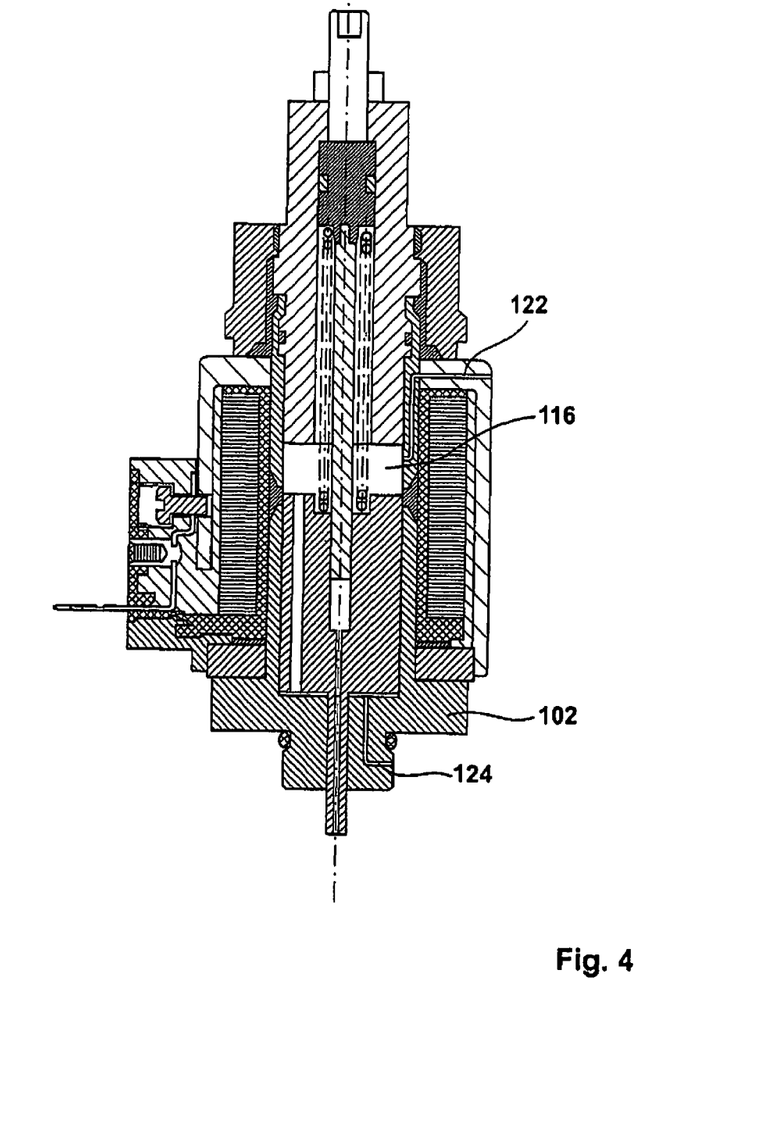
FIG. 4 shows another example sectional representation of a third example of a pilot-control stage according to the examples disclosed in a resting state.

The third example of a pilot-control stage in accordance with the teachings of this disclosure shown in FIG. 4 differs from the first example shown in FIGS. 2a-b merely by the fact that an evacuation channel 122 is additionally provided in the housing 102, which flows into the second fluid chamber 116. The pressure within the first 102 and the second fluid chamber 116 can be adjusted with this relief channel 122.

In addition, a leak oil bore 124, which flows on the one hand into the first fluid chamber 101 and on the other hand into a connecting thread not shown here is provided in the housing 102. This leak oil bore 124 serves to discharge unwanted leak oil entering the piston chamber 110.

Figure 6:
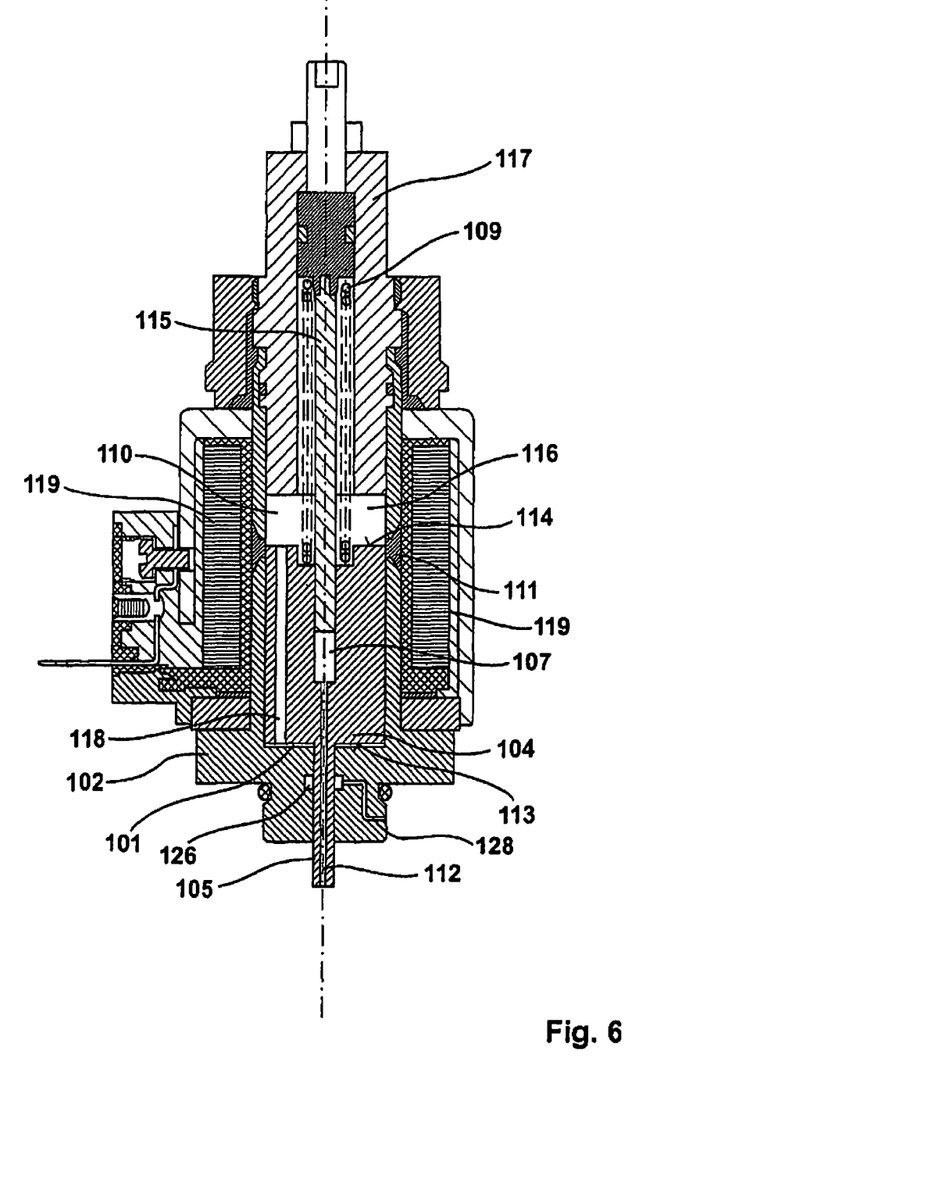
FIG. 6 shows another example sectional representation of a fourth example of a pilot-control stage in a resting state.

The fourth example of a pilot-control stage according to the examples disclosed herein shown in FIG. 6 differs from the first example shown in FIGS. 2a-b in that a ring chamber 126, to which a leak oil bore 128 is connected, is additionally provided in the housing 102 in the area of the tappet 105. The ring chamber 126 is located above the gap seal and prevents leak oil that has potentially entered through the gap seal from getting into the piston chamber 110, this leak oil being collected in the ring chamber 126 and being discharged through the leak oil pipe 128.

In other examples, the high-pressure seal is designed as a dynamic seal, which expands under pressure. A circumferential slide ring is thereby used.

The operation of the pilot-control stage according to the examples disclosed herein is explained in the following.

In the rest position, the control piston 104 is pressed downward by the spring 109 in such a manner that the first fluid chamber 101 is reduced to a minimum. At the same time, the tappet 105 reaches up to the hydraulic valve 108 and comes to rest on the following piston 106. An emergency safety system is thus formed, which closes the hydraulic valve 108 in case of a power outage or another malfunction.

The compensating chamber 107 is hydraulically connected to the pressure applied to the hydraulic valve 108 by way of the tappet bore 112. The pressure compensation that is achieved in this manner makes it possible to move the control piston 104 in an axial direction without having to overcome the forces generated by the hydraulic pressure, because the forces acting on the tappet 105 due to the hydraulic pressure and the compressive forces formed in the compensating chamber 107 compensate one another.

If an electric current is applied to the coil 119, an electromagnetic field is built up. Because the control piston 104 serves as an armature of this electromagnet, the control piston 104 is moved axially, in this case, upward. It has been shown that the control piston 104 can thereby be moved very precisely, so that an axial displacement of a few tenths of millimeters is possible.

Figure 5:
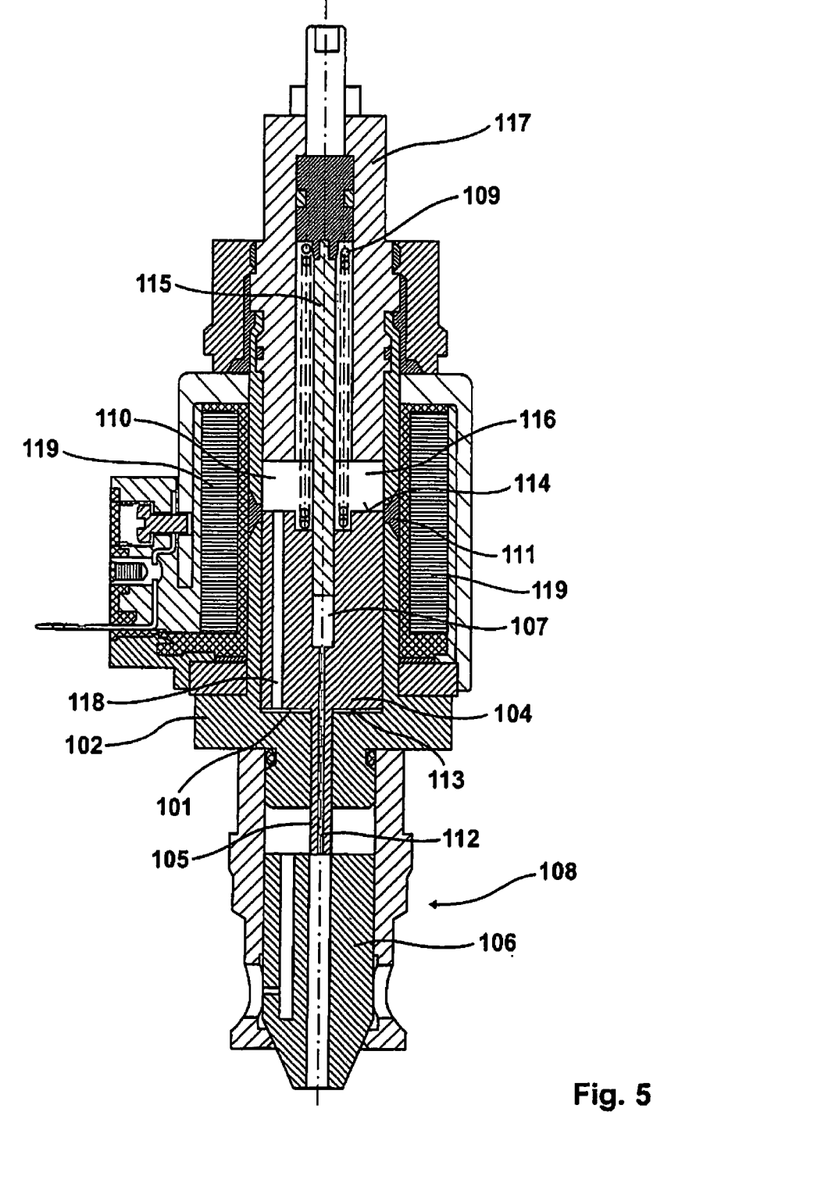
FIG. 5 shows the example pilot-control stage according to FIG. 2a as a pilot-control of a hydraulic valve with a following piston.

As can be seen more specifically in FIG. 5, a proportionally controlled hydraulic valve 108 configured as a following piston valve, which is designed here as a 2-way valve but which can also be designed as a 3-way valve or a 4-way valve in other examples, can be controlled by the pilot-control stage according to the examples disclosed herein.

In the examples described herein, the hydraulic cross-section of the compensating piston 115 and, thus, of the compensating chamber 107 is identical to the hydraulic cross-section of the tappet 105. The pressures applied to the hydraulic valve 108 can hereby be compensated for and do not apply a force onto the control piston 104.

In another example, the hydraulic cross-section of the compensating chamber 107 can be greater than the hydraulic cross-section of the tappet 105. In such examples, a force acts on the control piston 104 and causes a reliable closing of the hydraulic valve 108 in case of an emergency, for example, in which a malfunction or a power outage occurs. An additional emergency safety system is, thus, achieved.

The very compact structure of the pilot-control stage for proportionally controlling a high-pressure hydraulic valve according to the examples disclosed herein enables many application possibilities. One example is the use in agricultural vehicles or machines for controlling plant processing or earthworking tools or the use in production lines.

The examples disclosed herein allow manufacturing costs to also be reduced, amongst others, because proportional magnets such as those in known examples may be eliminated. Another advantage is that due to the small number of components, the manufacturing tolerances are reduced at least in total, so that a more precise control of the hydraulic pressure is possible. Last but not least, the device becomes much lighter and less expensive to manufacture.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A pilot-control stage for a proportionally controlled high-pressure hydraulic valve comprising:
   a housing including a piston chamber;
   a guide piston mounted in the housing in an axially displaceable manner, the guide piston including a control piston mounted in the piston chamber in an axially displaceable manner and a tappet extending through the housing, so the tappet can be operatively connected to a following piston of the hydraulic valve;
   a compensating piston extending into a compensating chamber formed in the control piston, and
   an axially oriented tappet bore formed in the guide piston that extends from the compensating chamber to the free end of the tappet, the tappet bore to hydraulically connect the compensating chamber to the hydraulic valve,
   wherein the housing is configured as a pole tube at least in an area of the control piston,
   wherein an electromagnetic coil is disposed around the pole tube,
   wherein the control piston is configured as an electromagnetic armature, so the coil interacts with the control piston in such a manner when an electric current is applied onto the coil, the control piston and thus the tappet are axially moved and the piston chamber is sealed off from the high-pressure area of the hydraulic valve by a high-pressure seal between the compensating piston and the control piston and by a high-pressure seal between the tappet and the housing in such a manner the piston chamber is kept pressureless or in a low-pressure range, and
   wherein a displacement sensor is provided on the housing that interacts with a sheath coupled to the control piston, the displacement sensor to at least partially surround the sheath.

2. The pilot-control stage according to claim 1, wherein a spring, which acts on the guide piston and pushes it into a rest position, is disposed in the piston chamber.

3. The pilot-control stage according to claim 1, wherein the hydraulic cross-section of the compensating piston is identical to the hydraulic cross-section of the tappet.

4. The pilot-control stage according to claim 1, wherein a magnetic field created by the coil pulls the control piston.

5. The pilot-control stage according to claim 1, wherein the high pressure seal comprises a gap seal.

6. The pilot-control stage according to claim 5, wherein the gap of the gap seal has a maximum thickness of 8 micrometers ($\mu m$).

7. The pilot-control stage according to claim 1, wherein a leak oil bore is connected to the piston chamber.

8. The pilot-control stage according to claim 1, wherein a connection bore is provided in the control piston in order to ensure a pressure compensation during the axial displacement of the control piston in the piston chamber.

9. The pilot-control stage according to claim 1, wherein the sheath is mounted coaxially.

10. The pilot-control stage according to claim 1, wherein the displacement sensor radially surrounds at least a portion of the sheath.

11. The pilot-control stage according to claim 10, wherein the displacement sensor includes a cylindrical shape.

12. A pilot-control stage for a proportionally controlled high-pressure hydraulic valve comprising:
    a housing including a piston chamber;
    a guide piston mounted in the housing in an axially displaceable manner, the guide piston including a control piston mounted in the piston chamber in an axially displaceable manner and a tappet extending through the housing, so the tappet can be operatively connected to a following piston of the hydraulic valve;
    a compensating piston extending into a compensating chamber formed in the control piston, and
    an axially oriented tappet bore formed in the guide piston that extends from the compensating chamber to the free end of the tappet, the tappet bore to hydraulically connect the compensating chamber to the hydraulic valve,
    wherein the housing is configured as a pole tube at least in an area of the control piston,
    wherein an electromagnetic coil is disposed around the pole tube,
    wherein the control piston is configured as an electromagnetic armature, so the coil interacts with the control piston in such a manner when an electric current is applied onto the coil, the control piston and thus the tappet are axially moved and the piston chamber is sealed off from the high-pressure area of the hydraulic valve by a high-pressure seal between the compensating piston and the control piston and by a high-pressure seal between the tappet and the housing in such a manner the piston chamber is kept pressureless or in a low-pressure range, and
    wherein a displacement sensor is provided on the housing that interacts with a sheath coupled to the control piston, the sheath to be disposed between a spring and the displacement sensor in a radial view.

13. An apparatus comprising:
    a housing of a hydraulic valve, the housing comprising a piston chamber;
    a guide piston disposed within the piston chamber to move in an axial direction along the piston chamber, the guide piston having an aperture, a control piston and a tappet;
    a compensating piston extending into the aperture, wherein the compensating piston moves in an axial direction along the aperture to define a compensating chamber;
    a bore fluidly coupling the hydraulic valve to the compensating chamber;
    an electromagnetic coil at least partially surrounding the piston chamber;

high-pressure seals between the compensating piston and the control piston, and between the tappet and the housing, wherein the control piston acts as an electromagnetic armature and current applied to the coil moves the guide piston and the tappet, and wherein the high-pressure seals isolate the piston chamber from the high-pressure areas; and a displacement sensor mounted to a surface of the housing that interacts with a sheath disposed on the control piston, the surface at least partially defining a portion of the piston chamber that surrounds the control piston.

14. The apparatus as defined in claim 13, further comprising a spring, which acts on the guide piston and pushes it into a rest position, disposed within the piston chamber.

15. The apparatus as defined in claim 13, wherein the hydraulic cross-section of the compensating piston is identical to the hydraulic cross-section of the tappet.

16. The apparatus as defined in claim 13, further comprising a leak oil bore fluidly coupled to the piston chamber.

17. The apparatus as defined in claim 13, wherein the displacement sensor radially surrounds at least a portion of the sheath.

18. The apparatus as defined in claim 17, wherein the displacement sensor includes a cylindrical shape.

19. The apparatus as defined in claim 13, wherein a spring that acts on the guide piston is at least partially disposed within the sheath.

* * * * *